(12) United States Patent  
Money

(10) Patent No.: US 7,042,675 B2  
(45) Date of Patent: May 9, 2006

(54) HERMETICALLY SEALED MOBILE HARD DISK DRIVE UTILIZING A BASE MADE OF A CERAMIC SUBSTRATE

(76) Inventor: James Bryant Money, 1360 Santa Inez Dr., San Jose, CA (US) 95125

( * ) Notice: Subject to any disclaimer, the term of this patent is extended or adjusted under 35 U.S.C. 154(b) by 181 days.

(21) Appl. No.: 10/419,336

(22) Filed: Apr. 21, 2003

(65) Prior Publication Data

US 2004/0207953 A1 Oct. 21, 2004

(51) Int. Cl.  
*G11B 5/012* (2006.01)

(52) U.S. Cl. .................................. 360/97.01; 360/99.08
(58) Field of Classification Search .... 360/97.01–97.02  
See application file for complete search history.

(56) References Cited

U.S. PATENT DOCUMENTS 5,264,975 A * 11/1993 Bajorek et al. .......... 360/97.01

FOREIGN PATENT DOCUMENTS

JP 11-251839 * 9/1999

* cited by examiner

*Primary Examiner*—A. J. Heinz

(57) ABSTRACT

Disclosed is a hermetically sealed mobile hard disk drive that combines high storage capacity and performance with low power consumption and portable operation. The key enabling component of the mobile storage device is an integrated base ceramic substrate upon which a plurality of spiral conductors, MR stripes and interconnect conductors have been fabricated by a semiconductor process, and upon which electronic integrated circuits have been assembled. A single or dual rotor spindle assembly, a multi-arm actuator assembly and a ceramic housing are assembled with the integrated base forming a chamber that is hermetically sealed and can be filled with a low viscosity gas at ambient pressures or below.

7 Claims, 8 Drawing Sheets

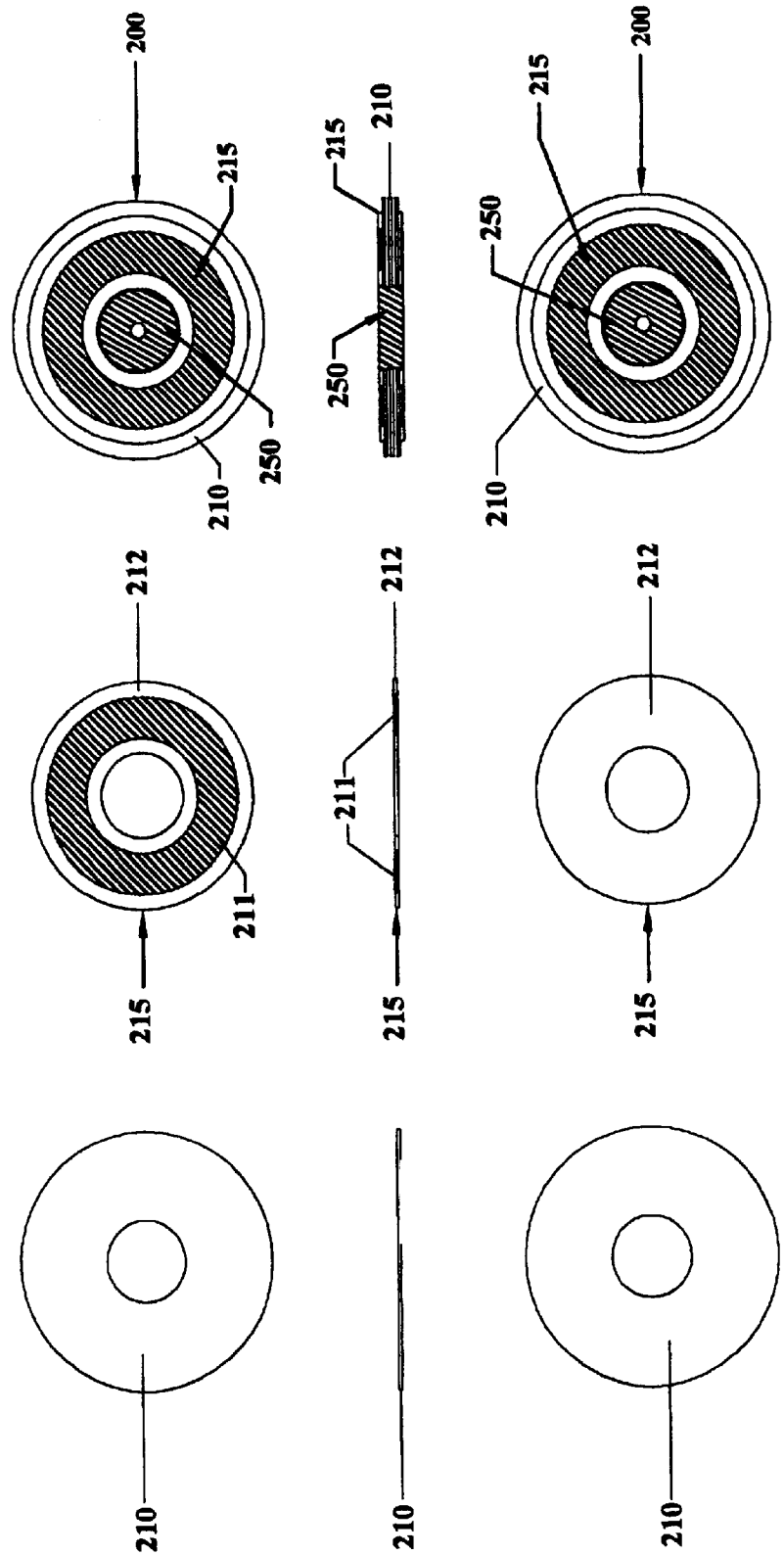

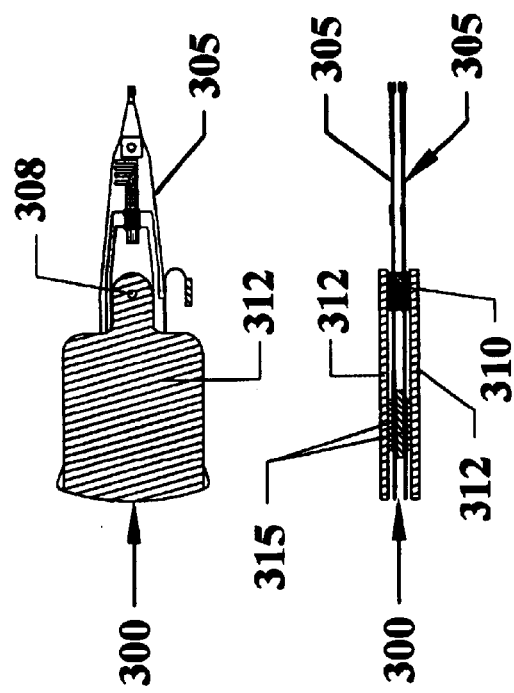
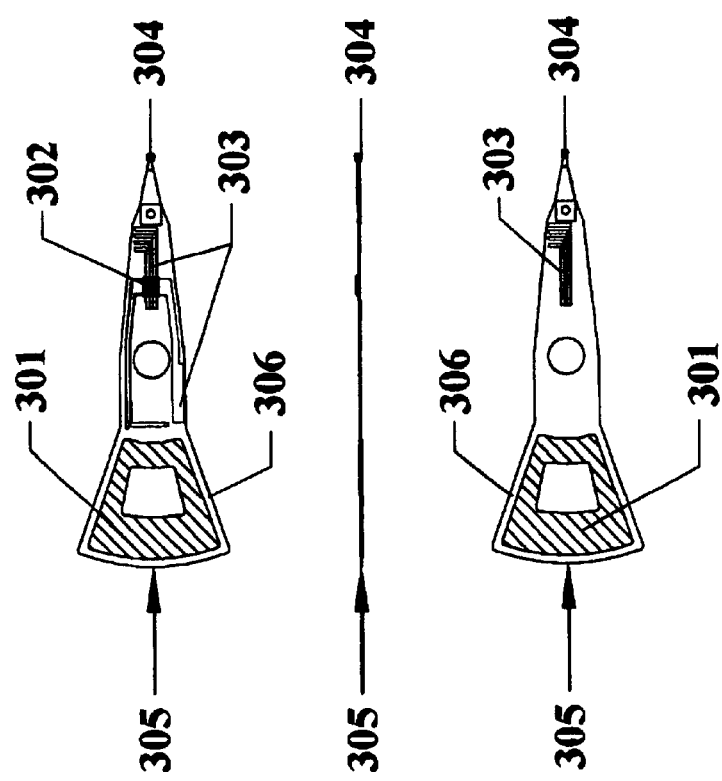
Figure 3b
Figure 3a

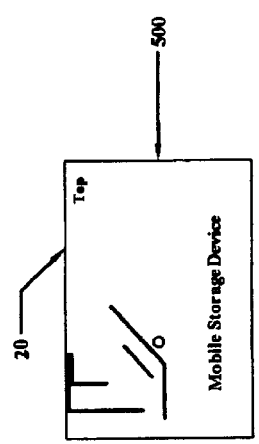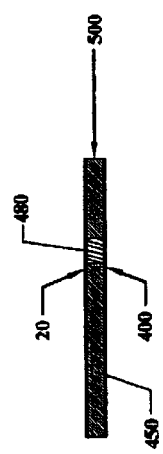
Figure 5a
Figure 5b
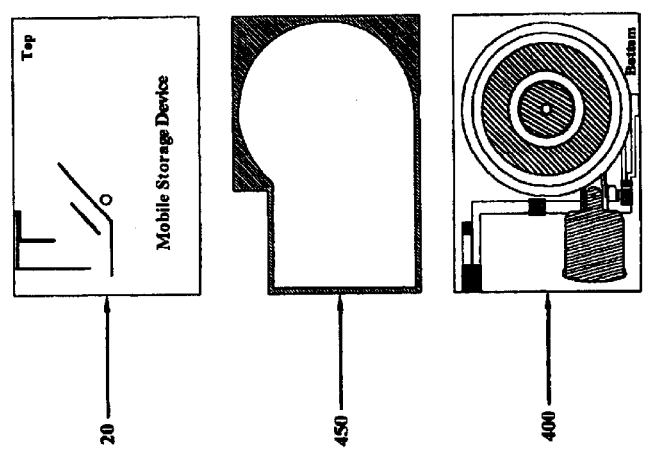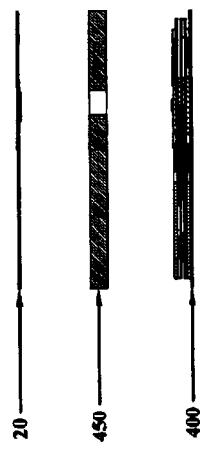

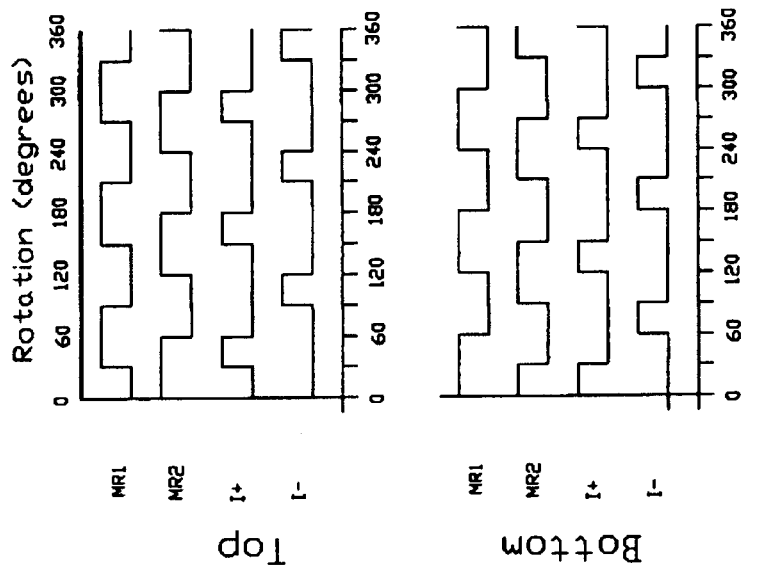
Figure 8c
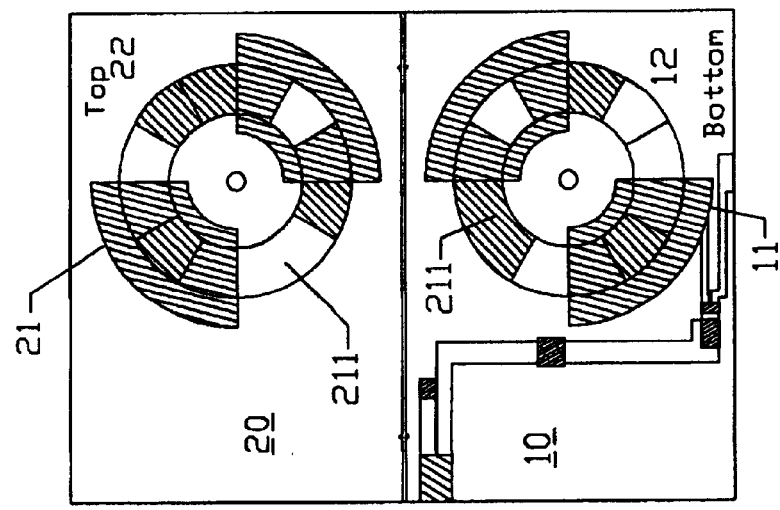
Figure 8b
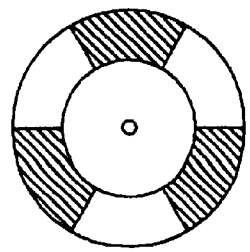
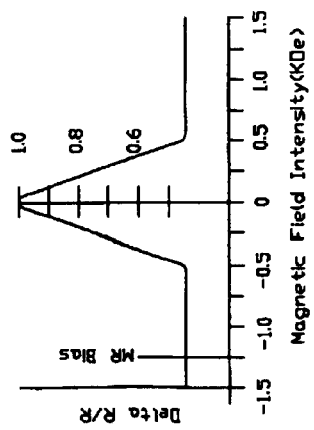
Figure 8a

HERMETICALLY SEALED MOBILE HARD DISK DRIVE UTILIZING A BASE MADE OF A CERAMIC SUBSTRATE

BACKGROUND—CROSS REFERENCES TO RELATED APPLICATIONS

This invention uses the transmission of my co-pending applications, Ser. No. 09/827,119, filed Apr. 5, 2001, and entitled "Dual-Modular Actuators Having a Common Axis of Rotation" and application, Ser. No. 09/932,684, filed Aug. 20, 2001 and entitled "Variable Speed Integrated Planar Motor Assembly".

BACKGROUND—DESCRIPTION OF PRIOR ART

This invention relates to Data Storage Systems, specifically those using magnetic recording on rigid disks.

BACKGROUND—DESCRIPTION OF PRIOR ART

Hard Disk Drives (HDDs) are based on magnetic recording technology which has been increasing the amount of data stored on a single 2.5-inch disk from today's 40 GB to an expected 180 GB in two to four years. However the manufacturing of HDDs has not kept pace with these advances and remains, for the most part, a labor intensive assembly operation. This approach requires expensive tooling and specialized capital equipment expenditures each time a new product is introduced. In addition, high power consumption and high performance are synonymous with HDDs and limits their use in emerging applications requiring mobile high speed digital storage and playback. One of the major contributors, to high power consumption, is the viscous drag of the surrounding air on the magnetic disks during high speed angular rotation. This drag is directly proportional to the air density and its viscosity which surrounds the disks and leads to high temperatures with the HDD. In addition, the surrounding air can be humid and condensation can occur on the surface of the disks during operation.

OBJECTS AND ADVANTAGES

Advances in disk storage capacities coupled with the high I/O performance of multi-actuators and high rotational speed disk drives, has created an opportunity to provide these features in a hermetically sealed mobile hard disk drive that can be battery powered for an extensive period of time. Accordingly, several objects and advantages of my invention are:

to provide a hermetically sealed mobile hard disk drive that is battery and/or bus powered.

to provide an integrated base that integrates all key electrical components on a high strength ceramic substrate which was manufactured by processes and equipment common to the semiconductor industry.

to provide a hermetically sealed mobile hard disk drive totally enclosed in a hermetically sealed chamber.

to provide a robust hermetically sealed mobile hard disk drive that can rotate at high rotational speeds with low power consumption.

to provide a hermetically sealed mobile hard disk drive with a high torque to inertia actuator assembly for fast access times with minimum power.

to provide a variable speed spindle motor.

Further objects and advantages of my invention will become apparent from a consideration of the drawings and ensuing description.

DRAWING FIGURES

FIGS. 2a–2c shows the top, front, and bottom views of the magnetic disk, rotor and spindle assembly.

FIG. 3a shows the top, front, and bottom views of the actuator arm assembly and

FIG. 3b shows the top and front views of the actuator assembly.

FIGS. 5a–5b shows the top and front view of the components and assemblies of the hermetically sealed mobile hard disk drive.

FIGS. 8a–8c shows the relationship between the permanent magnets, stator coils and MR sensors and the resulting waveforms.

DESCRIPTION—FIGS. 1–8

Figure 1:
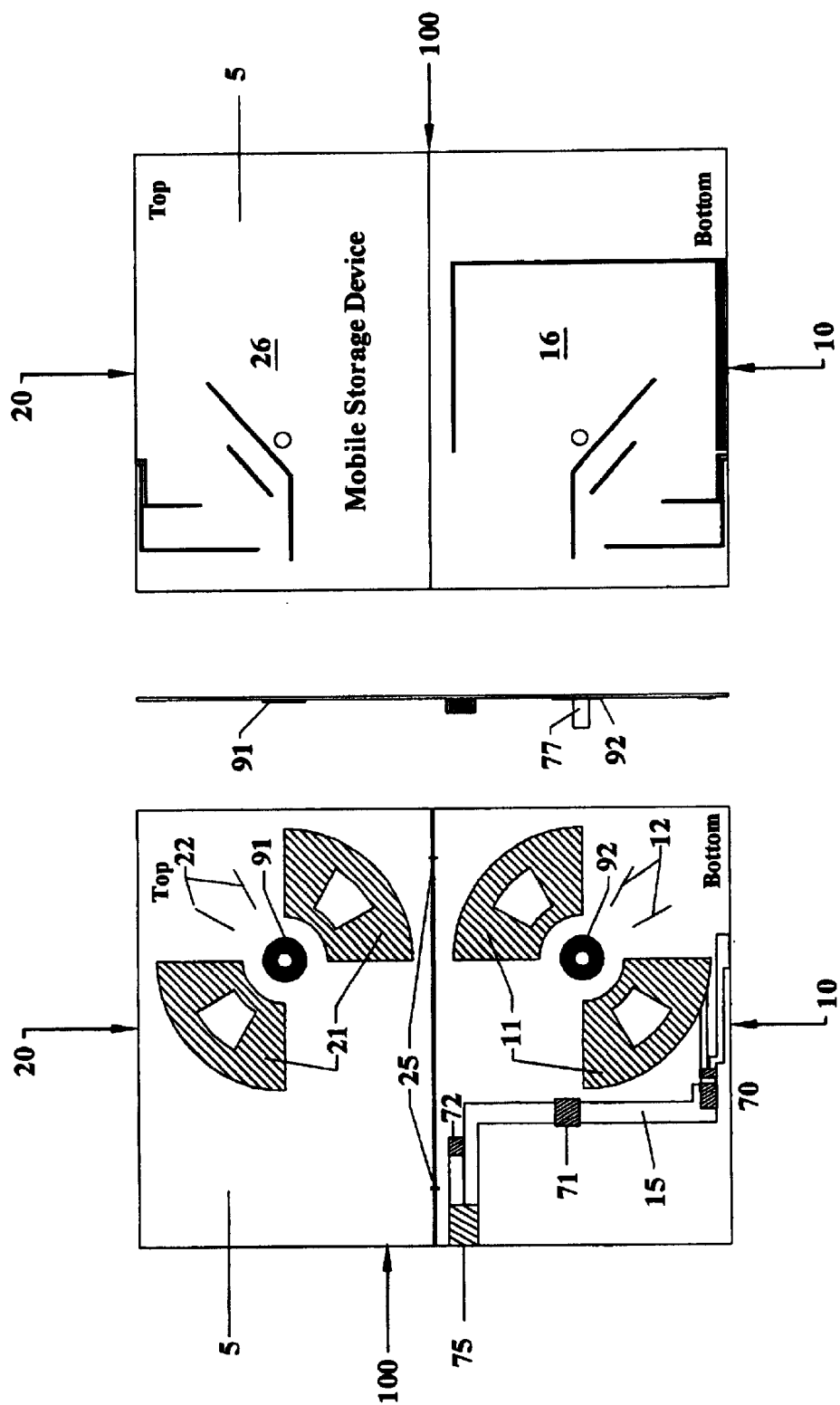
FIG. 1 shows the front, profile and back views of the integrated base.

FIG. 1 shows the front, profile and back views of the integrated base 100 a component of the hermetically sealed mobile hard disk drive. In one embodiment, the integrated base was manufactured on ceramic substrate 5 using the following materials and processes.

1: In one preferred embodiment, ceramic substrate 5 is manufactured with an Yttria-Partially Stabilized Zirconia (YTZP) material whose salient properties are given in Table 1. This material exhibits excellent strength and fracture toughness and is able to absorb the high energy of impact without shattering or deforming.

TABLE 1

| Yttria-Partially Stabilized Zirconia (YTZP)[1] | |
| --- | --- |
| Density | 6.02 (grams/cm$^3$) |
| Flexural Strength | 1,300 (MPa) |
| Fracture Toughness | 13 (MPa * m$^{1/2}$) |
| Compressive Strength | 2,500 (MPa) |
| Coefficient of Linear Expansion | 10.3 (10$^{-6}$/° C.) |
| Thermal Conductivity | 2.2 (W/m * ° K.) |

[1]As per CoorsTek, a manufacturer of Technical Ceramics

2: Front to back via holes are laser machined in substrate 5 and filled with low resistivity copper. The substrate is now lapped and polished, on both surfaces, for flatness and smoothness.

3: IC interconnect traces 15, 16 and 26 are fabricated by sputtering 2–4 microns of copper on the front and back surfaces of substrate 5. Photoresist is applied to both surfaces, exposed with photo masks defining the interconnect traces and developed. The substrate is sputter-etched, or ion-milled, to remove all copper not covered with photoresist.

4: The MR stripes, 12 and 22, are fabricated by sputtering a magneto resistive material, such as 80–20 Nickel-Iron (Ni-Fe), followed by a film of copper. Photoresist is applied, exposed and developed and then the substrate is sputter-etched, or ion-milled, to remove the copper-Ni-Fe material not covered with photoresist.

5: A 5–6 micron film of aluminum oxide ($Al_2O_3$) is sputter deposited on both surfaces of substrate 5 and then double sided lapped and polished with a process know as CMP (Chemical Mechanical Planarization).

6: Via's back to interconnect traces 15, 16 and 26 are fabricated by applying photoresist to both surfaces of substrate 5, expose with photo mask to define via location, develop, and etch $Al_2O_3$.

7: The fabrication of the spindle motor stator coils 11 and 21 starts with the sputtering of a copper seed layer followed by the application of an ultra-thick photoresist (20–100 microns) on the front surface of substrate 5. The substrate is exposed with a photo mask defining the spiral coil pattern, developed and copper is electroplated into the openings with the thickness of the copper equal to the photoresist thickness. The photoresist is stripped and the copper seed layer is removed by etching. These resists, such as the Shipley BRP100 or the Clariant AZ PLP 100XT, can achieve aspect ratios of 10 to 1 (height/width) with near vertical walls and optimized for the fabrication of copper electroplated conductors.

8: Mount "bumped" IC's 70, 71 and 72 and the mini-connector 75 using a solder re-flow operation.

9: A YTPZ Zirconia spindle motor shaft 77 is bonded to substrate 5 in a fixture to ensure its extension and perpendicularity to substrate 5.

10: A precision ceramic washer 92 and a spring type washer 91 are bonded to substrate 5. Washer 92 establishes the spindle motor air gap and washer 91 will pre-load the spindle motor bearings.

11: Separate the integrated base into two parts, an integrated base-bottom 10 and an integrated base-top 20, with a laser machining process using alignment marks 25.

FIG. 2a is the top, front and bottom views of the magnetic disk 210 consisting of a magnetic film deposited on a glass substrate. Magnetic disk 210 is available from a variety of manufactures in high volume and at a reasonable cost FIG. 2b is the top, front and bottom view of the rotor assembly 215 consisting of a thin cylindrical permanent magnet of Neodymium-Iron-Boron (NdFeB) 211 mounted on rings 212 of 50—50 Nickel-Iron (Ni-Fe), a soft magnetic material having high saturation magnetization. The Ni-Fe rings acts as a rigid holder of the NdFeB permanent magnet, and a low reluctance magnetic flux return. The rotor assembly is ground and lapped flat and then magnetized perpendicular to its face. FIG. 2c is the top, front and bottom view of the spindle assembly 200. It was assembled as follows.

Bearing sleeve 250 consists of two precision bearings installed in an alumina ($Al_2O_3$) ceramic sleeve or equivalent. The bearings were installed with their races flush with the ends of the ceramic sleeve.

Magnetic recording disks 210 are precisely located and bonded to bearing sleeve 250, using pre-forms of UV curable glass filled adhesives.

Two rotor assemblies 215 are bonded to bearing sleeve 250 with their face coplanar to the ends of bearing sleeve 250.

FIG. 3a is the top, front and bottom view of the actuator arm 305, a key and enabling component that integrates all key components, of a high density magnetic recording system, on a rigid and lightweight ceramic arm 306. These components are;

Two GMR HGAs 304 for reading/writing of data to the magnetic disk

A low-power preamplifier/write driver/actuator coil driver IC 302.

Actuator coils 301.

Interconnects 303.

The actuator coils and interconnects were fabricated on large ceramic substrates using processes and equipment common to the semiconductor industry.

FIG. 3b is the top and front view of the actuator assembly 300. Two actuator arms 305 are mounted to a pivot sleeve 310 and are free to rotate about fixed shaft 308. NdFeB magnets 315 are bonded to magnetic returns 312 and magnetized perpendicular to the magnets face. Magnetic return 312 is made from a soft magnetic material having a high saturation magnetization. Actuator coil 301 resides in the magnetic field produced by the NdFeB magnets and will produce a torque on the actuator arm proportional to the current flowing in actuator coil 301.

Figure 4:
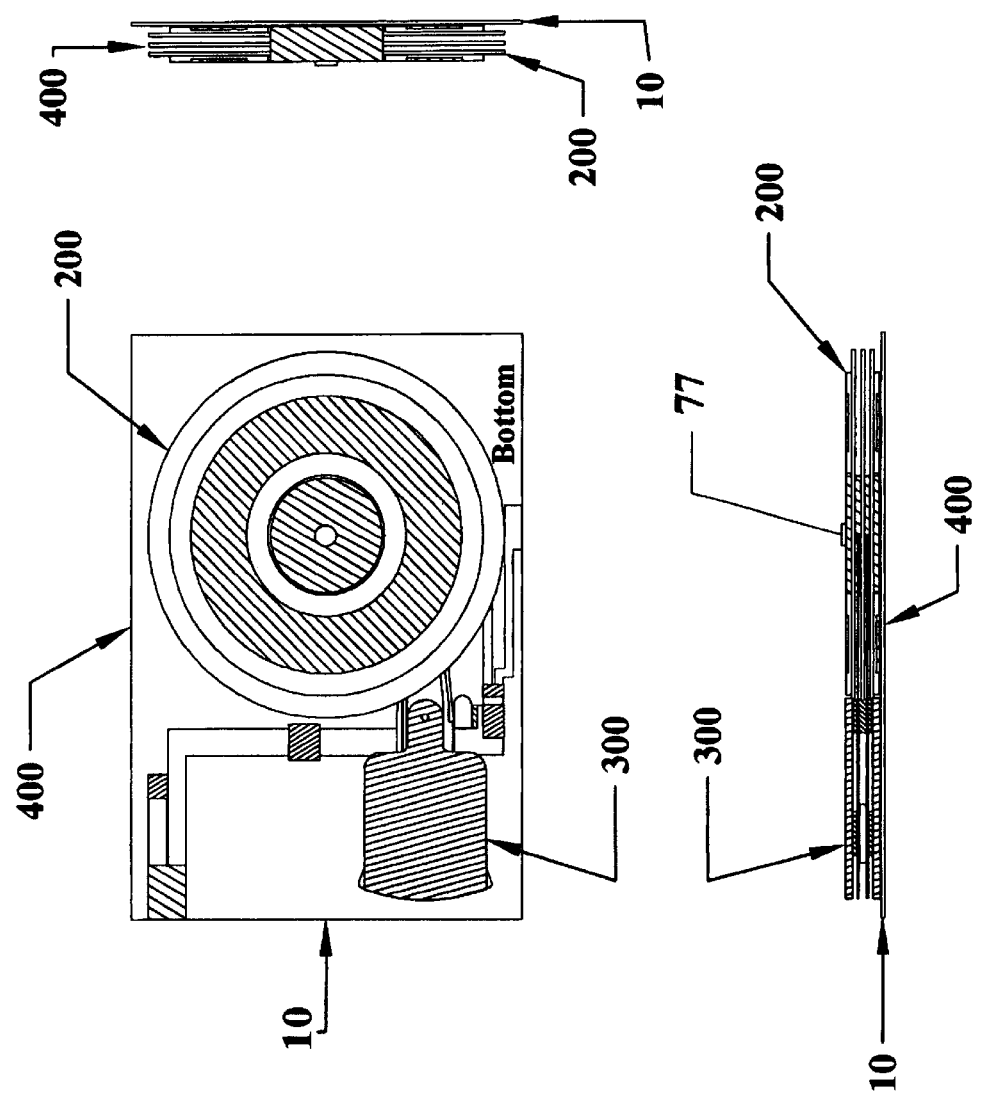
FIG. 4 shows the top, front and profile views of the hard disk drive assembly.

FIG. 4 shows the top, front and profile views of the hard disk drive assembly 400. The spindle assembly 200 has been assembled to the integrated base-bottom 10 over shaft 77. The actuator assembly 300 is then positioned and bonded to the integrated base-bottom 10 using a high strength structural adhesive.

FIG. 5a is the top view and FIG. 5b is the front view of the final assembly of the hermetically sealed mobile hard disk drive 500.

An injection molded YTPZ Zirconia housing 450 is bonded to the integrated base-bottom 10 of hard disk drive assembly 400 with a high strength structural adhesive.

The integrated base-top 20 is bonded to Zirconia housing 450 with a high strength structural adhesive.

Cable 480 is attached to electrically connect interconnect traces on integrated base-bottom 10 to interconnect traces on integrated base-top 20.

The chamber formed by integrated base-bottom 10, integrated base-top 20 and Zirconia housing 450 can now be evacuated and refilled with a low viscosity gas at a pressure between 0.1 and 1.0 atmosphere (0.15 to 14.7 lbs/in$^2$).

Figure 6:
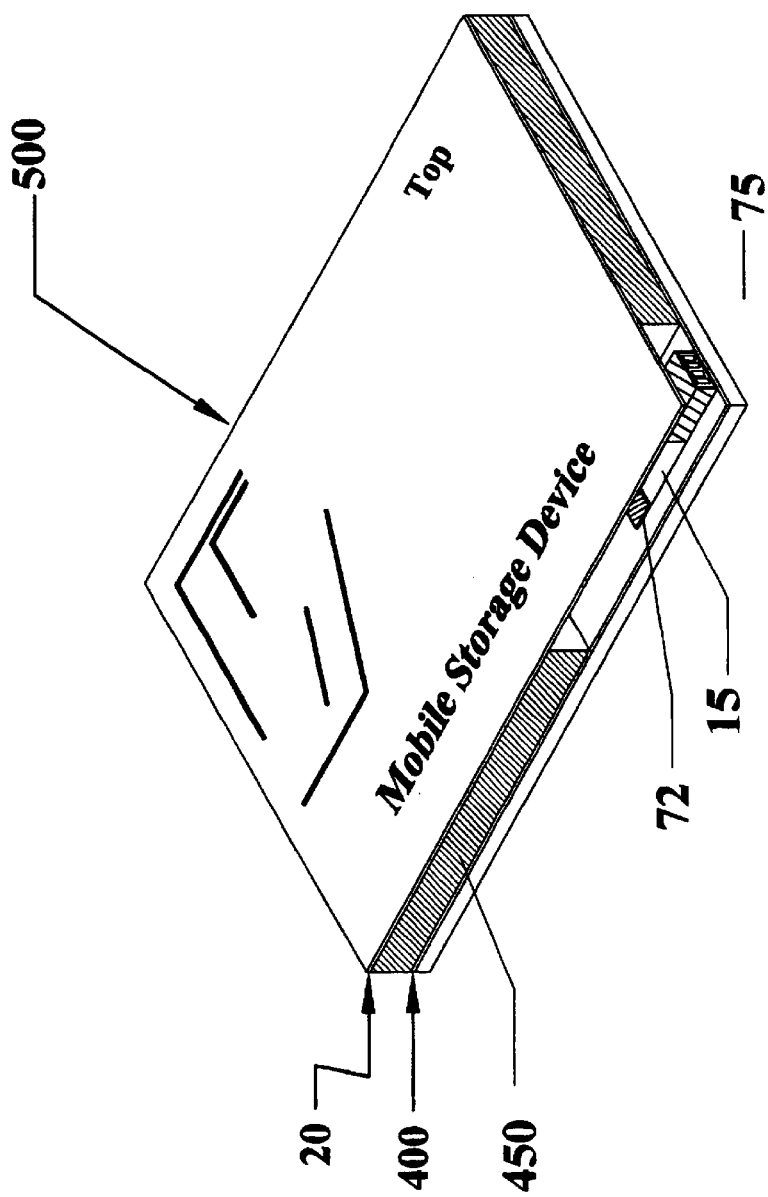
FIG. 6 is a three-dimensional drawing of the hermetically sealed mobile hard disk drive.

FIG. 6 is a three-dimensional drawing, showing the components and their relationship to each other, of the hermetically sealed mobile hard disk drive 500.

Figure 7:
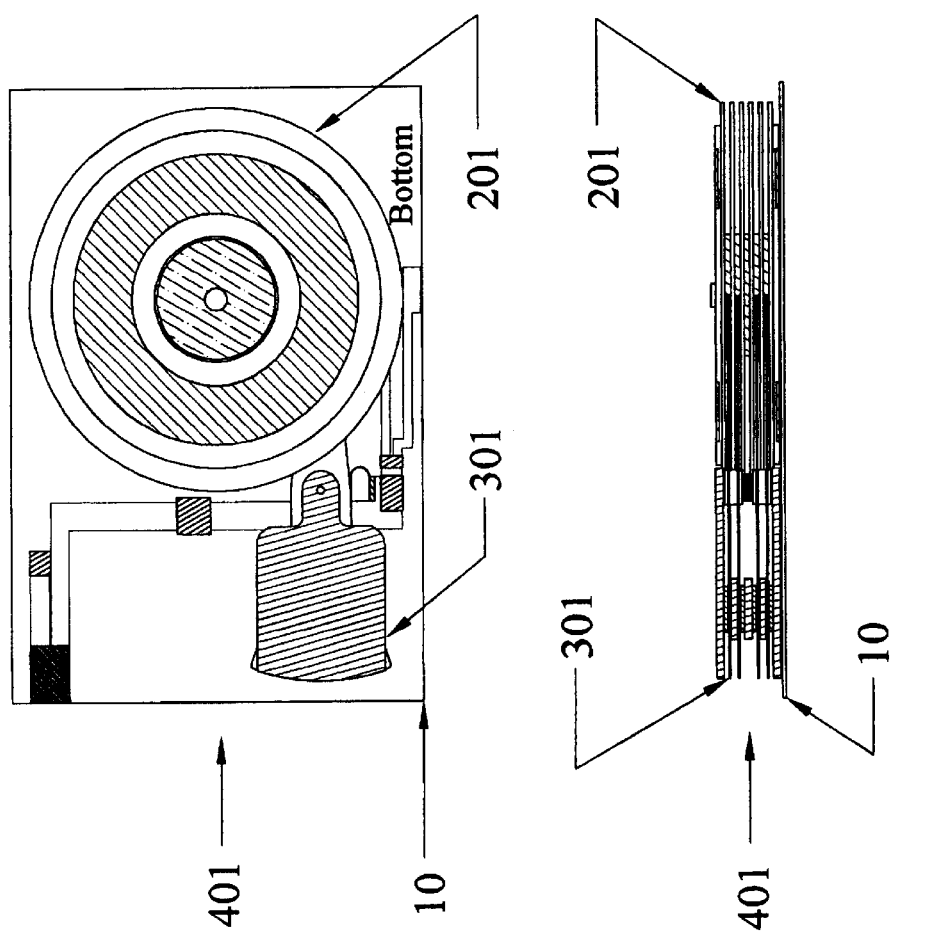
FIG. 7 shows the top and front views showing the components and assemblies for a 4 disk/dual-actuator hermetically sealed mobile hard disk drive.

FIG. 7 shows the front and top views of hard disk drive assembly 401 configured with a dual-actuator assembly 301 and a 6 disk spindle assembly 201. The dual-actuator assembly 301 consists of 4 actuator arms 305 arranged on 2 independent pivots. The actuator coil, on each actuator arm 305, interacts with the magnetic field produced by the NdFeB magnets to produce torque to each pivot assembly. The dual-actuator assembly 301 and spindle assembly 201 are assembled to the integrated base-bottom 10 over shaft 77.

OPERATION—FIG. 8

The NdFeB magnets 211 have been magnetized, perpendicular to their faces, into 6 equal segments of alternating polarity as shown in FIG. 8a. This creates a magnetic intensity in the air gap of +B and −B. With the MR stripes biased to the magnetic intensity −B, the resistance of the MR stripe will change when the magnetic intensity in the air gap is +B, and the resistance will remain the same when the magnetic intensity in the air gap is −B.

The relationship between the spiral stator coils 11, MR stripes 12 and NiFeB magnet 211 is shown in FIG. 8b. The start of the stator coil 11 is labeled S1 and the spiral conductor goes along radial lines inward in region 1 and along radial lines outward in region 2. Region 1 is connected to region 2 along circular arc conductors until it terminates in the center of the spiral coil. In the preferred embodiment, the angular widths of regions 1 and 2 are 30°. A mirror image of this coil is located as shown in FIG. 8b. The angular relationships of the two spiral coils are given in the following table.

|  | Spiral Coil 1 | | Spiral Coil 2 | |
| --- | --- | --- | --- | --- |
|  | Start | End | Start | End |
| Region 1 | 0 | 30 | 240 | 270 |
| Region 2 | 60 | 90 | 180 | 210 |

A duplicate of the spiral stator coils 11 and MR stripes 12 are fabricated on the integrated base-top 20. The top NdFeB magnet is offset 30° from the bottom magnet as shown in FIG. 8b.

The first MR stripe is located 120° from the start conductor in region 1 and the second MR stripe is located 30° from the first. When the bottom NdFeB magnet rotates CCW relative to the spiral stator coil 11, the outputs of the MR stripes, labeled MR1 and MR2, will be as shown in the bottom waveforms of FIG. 8c with the outputs reflecting the polarity and intensity of the magnetic field in the air gap. The logical signals MR1 and MR2 are used to derive the current gating waveforms I+ and I−. During I+, a positive current from S1 to S2 produces a positive torque and during I−, a negative current produces a positive torque.

With the top NdFeB magnet offset by 300 from the bottom magnet, the top waveforms will be identical to the bottom waveforms but offset by 30°.

The combined I+ and I− waveforms, from the bottom and top MR stripes, allow current, and therefore torque, to be applied to the rotor on a near continuous basis.

CONCLUSIONS, RAMIFICATIONS AND SCOPE

Accordingly, the reader will see that the hermetically sealed mobile hard disk drive of this invention, has shown and demonstrated;

a hermetically sealed mobile hard disk drive having high performance and capacity with ultra low power consumption.

a hermetically sealed mobile hard disk drive whose performance is immune to its surrounding environment.

a hermetically sealed mobile hard disk drive which can be battery powered and recharged when attached to a bus.

a hermetically sealed mobile hard disk drive where the key and enabling components are manufactured using processes and equipment common to the semiconductor industry.

a hermetically sealed mobile hard disk drive with a variable speed single or dual rotor spindle motor having near continuous torque control.

a hermetically sealed mobile hard disk drive which can be configured with single or dual actuators.

a hermetically sealed mobile hard disk drive with the actuator and spindle assemblies enclosed in a hermetically sealed chamber which has been filled with a low viscosity gas, at below ambient pressure, to reduce power and enhance performance.

a hermetically sealed mobile hard disk drive ideally suited for emerging high a real density recording.

Although the description above contains many specifications, these should not be construed as limiting the scope of the invention but as merely providing illustrations of some of the presently preferred embodiments of this invention. Many other variations are possible. For example the integrated base and actuator arm could be made from other materials, use other semiconductor processes, have other electrical components and have different shape and sizes.

Accordingly, the scope of the invention should be determined not by the embodiments illustrated, but by the appended claims and their legal equivalents.

What is claimed is:

1. A hermetically sealed hard disk drive comprising:
    an integrated base, including a substrate having a front surface and a back surface, a top portion and a bottom portion, a plurality of spiral conductor patterns, a plurality of MR stripes, and a conductor interconnect pattern for at least one IC and at least one connector;
    a shaft having a cylindrical axis substantially perpendicular to said front surface of said substrate;
    a spindle assembly wherein at least one spindle is mounted to said shaft to rotate about said cylindrical axis of said shaft, and said spindle assembly includes at least one magnetic disk and at least one rotor assembly, and said at least one magnetic disk and said at least one rotor assembly are assembled in combination with at least one bearing;
    an actuator assembly wherein actuator assembly is mounted to said bottom portion of said integrated base, and each actuator assembly includes at least one actuator arm assembly, and a least one permanent magnet, and said at least one actuator arm and said at least one permanent magnet are assembled in combination with at least one bearing; and
    a housing, wherein said top portion and said bottom portion of said integrated base are separated and assembled and bonded to said housing to form a hermetically sealed chamber containing said actuator assembly and said spindle assembly, and wherein said at least one permanent magnet interacts with said plurality of spiral patterns to provide a torque to said spindle assembly.

2. The hermetically sealed disk drive of claim 1, wherein said substrate includes ceramic material.

3. The hermetically sealed disk drive of claim 1, wherein said housing includes ceramic material.

4. The hermetically sealed disk drive of claim 1, wherein said at least one bearing in said spindle assembly is a bearing sleeve, and said bearing sleeve is bonded to at least one rotor assembly.

5. The hermetically sealed disk drive of claim 1, wherein said at least one bearing in said actuator assembly is a bearing sleeve.

6. The hermetically sealed disk drive of claim 1, wherein said at least one permanent magnet of said spindle assembly is deposited in a first planar magnetic film and said at least one permanent magnet of said actuator assembly is deposited in a second planar magnetic film, and both said first planar magnetic film and said second planar magnetic film are magnetized perpendicularly.

7. A hermetically sealed hard disk drive comprising:
    an integrated base, having a top portion and a bottom portion, including a ceramic substrate having a plurality of spiral conductor patterns, a plurality of MR stripes, and a conductor interconnect pattern for at least one IC, at least one connector and at least one cable attachment;

a shaft on said ceramic substrate;

a spindle assembly wherein at least one spindle is mounted to and rotates about said shaft, and said spindle assembly includes at least one magnetic disk and at least one rotor assembly, and said at least one magnetic disk and said at least one rotor assembly are assembled in combination with at least one bearing sleeve;

an actuator assembly wherein each actuator assembly is mounted to said bottom portion of said integrated base, and each actuator assembly includes at least one actuator arm assembly, and a least one permanent magnet, and said at least one actuator arm and said at least one permanent magnet are assembled in combination with at least one bearing sleeve; and a ceramic housing, wherein said top portion and said bottom portion of said integrated base are assembled and bonded to said ceramic housing to form a hermetically sealed chamber containing said actuator assembly and said spindle assembly, and wherein said at least one permanent magnet interacts with said plurality of spiral conductor patterns to provide a torque to said spindle assembly.

* * * * *